(No Model.)
W. W. GARY.
MAGNETO GENERATOR FOR RAILROAD SIGNALS.
No. 258,742. Patented May 30, 1882.
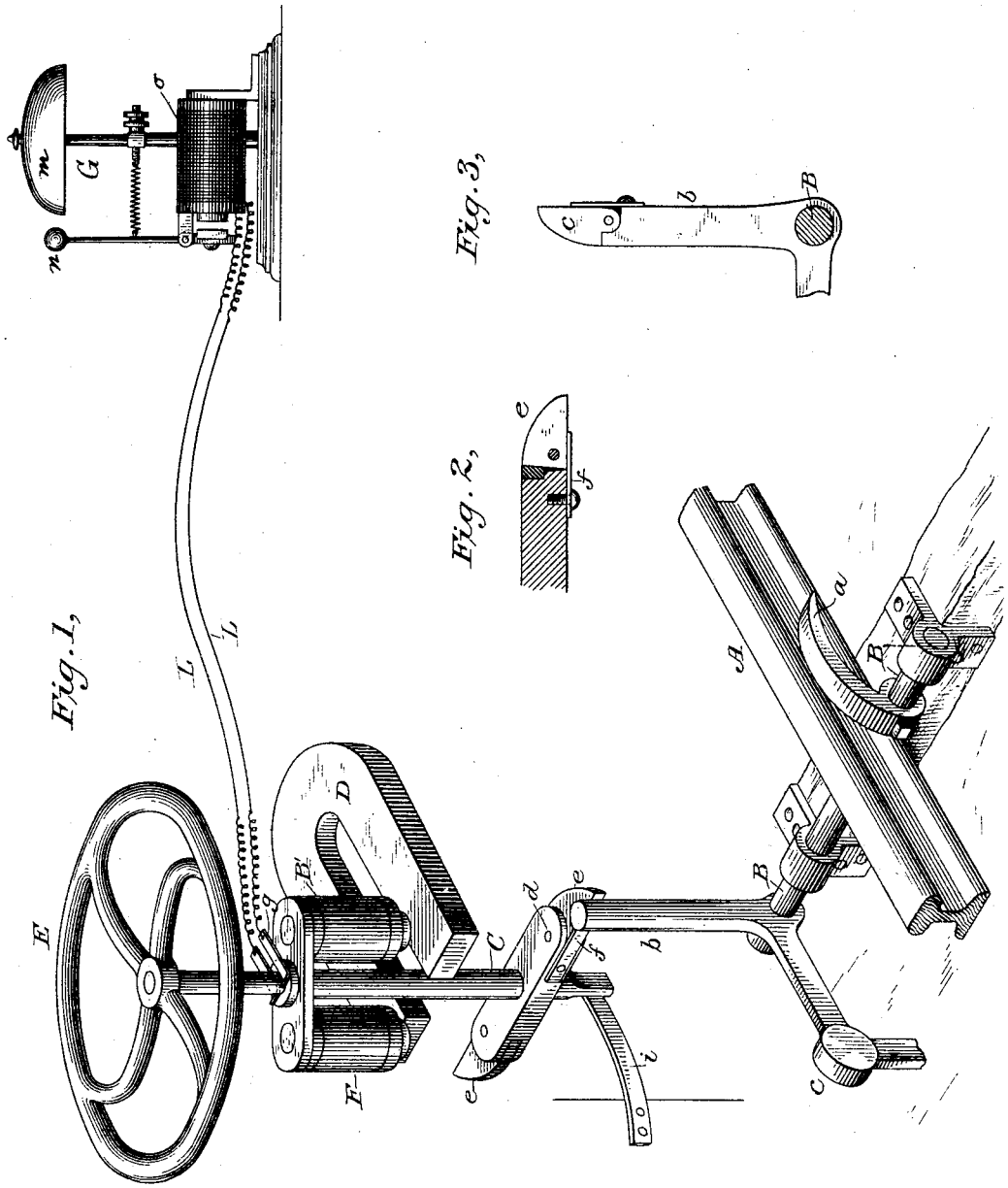
WITNESSES
Wm A. Skinkle
Geo W. Breck
INVENTOR
W. W. Gary
By his Attorney
Philip T. Dodge

UNITED STATES PATENT OFFICE.

WESLEY WARD GARY, OF BOSTON, MASSACHUSETTS.

MAGNETO-GENERATOR FOR RAILROAD-SIGNALS.

SPECIFICATION forming part of Letters Patent No. 258,742, dated May 30, 1882.

Application filed January 5, 1882. (No model.)

*To all whom it may concern:*

Be it known that I, W. W. GARY, of Boston, in the county of Suffolk and State of Massachusetts, have invented certain Improvements in Electric Railway-Signals, of which the following is a specification.

This invention relates to an automatic signal designed to be operated by moving railway-trains for the purpose of giving warning at a crossing or other station of the approach of the still distant train.

The objects of the invention are more particularly to produce a signal-system wherein the signal shall be driven or propelled with a continuing or prolonged action by means of an electric current and the electric current generated through a magneto-machine by the action of the passing trains thereon. It is designed to locate the signal-bell or equivalent signaling-instrument at the crossing or other point to be protected and connect the same electrically with a generator located at any suitable distance therefrom, usually at half a mile or thereabout, beside the railway-track, and to connect with the generator suitable appliances whereby motion may be imparted thereto by the passing train. In order that the current may be prolonged and its generation continued during the time that the train is passing from the generator to the signal, so as to keep the signal in action during said time, I provide the generator with a fly-wheel or equivalent device for utilizing the momentum created by the actuating force, whereby it will be continued in action after the railway-train has passed and ceased to operate thereon.

The accompanying drawings illustrate the apparatus in its preferred form.

Figure 1 is a perspective view, illustrating the generator and signaling-instrument connected therewith. Figs. 2 and 3 are detailed views, which will be hereinafter described.

Referring to the drawings, A represents an ordinary railway-rail, and B a horizontal rock-shaft extending transversely beneath the rail, and sustained in suitable bearings. The shaft B is provided on one end with a horizontal arm, $a$, in position to be depressed by the passing car-wheels, and is provided at the opposite end with an upright arm, $b$. The arm $b$ will be provided with a weighted extension, $c$, as shown, or with a weight or spring applied in any other suitable manner to raise the arm or treadle $a$ and turn the shaft to its normal position after each depression by the wheels. The shaft $c$ is provided near its lower end with a cross-bar, $d$, having its ends provided with pivoted dogs $e$, against which the upright arm $b$ acts to impart a rotary motion to the shaft. The dogs $e$ are jointed to the cross-bar, as shown in Fig. 2, by a knuckle-joint in such manner that, while they lock rigidly under the forward pressure of the arm, they yield freely in a backward direction in order to pass said arm as the latter returns to its normal position.

Springs $f$ may be applied, as shown in Fig. 2, to retain the dogs in their extended or operative position; but in practice it is found that these springs are not absolutely necessary, the centrifugal motion tending to keep the dogs in an outward position.

To the upper end of the shaft $c$ a soft-iron armature, B', coiled with insulated wire is applied. This coiled armature constitutes an induction-coil, and is similar to those used in ordinary magneto-generators familiar to all persons skilled in the art.

D represents a permanent magnet secured rigidly in position with its poles in close proximity to the poles of the revolving armature, so that as the armature rotates a strong induced current will be established in its coil in a manner common to all magneto-generators.

For the purpose of transmitting the current from the coil, conducting-fingers G are applied, as shown. These fingers may be arranged to conduct currents of alternating polarity directly to the signal-circuit; or a commutator of any approved form may be introduced for the purpose of reversing the currents, and thus producing in the circuit a continuous current of one polarity. The construction of these commutators being well understood in the art and constituting no part of the invention, it is deemed unnecessary to describe them in detail herein. The commutators will be used or not, according as it is desired to employ a continuous or alternating current to operate upon the signal, which will depend upon the character of the signal with which the generator is to be used.

For the purpose of rendering the motion of the generator uniform and continuing its action for a suitable length of time after the railway train has passed and ceased to act thereon, a fly-wheel, E, or equivalent device may be applied to the upper end of the shaft, as represented in the drawings. As the first wheel of the train passes the treadle or arm it is depressed thereby, thus transmitting motion through the rock-shaft to the arm $b$, the upper end of which imparts motion through the dogs to the bar $d$, and thence to the shaft and its armature, imparting to the latter a rapid rotation, which is continued by the momentum of the wheel for a considerable length of time after the passage of the train. In practice it is found that by suitably proportioning the parts the generator may be continued in action from three to five minutes after the train has passed. This mode of operation admits of a generator being placed at a distance of a mile or more from the crossing or station, and of its motion being continued until the train has reached the signal.

G represents the signal-instrument, being in the present instance an audible signal, consisting of a bell or gong, $m$, a vibrating striker, $n$, acting thereon, and an electro-magnet, $o$, which operates to attract the plate or armature upon the striker, and thereby cause the latter to act upon the bell. A spring may be applied, as shown, to move the striker in one direction. The construction of this instrument I do not claim as my invention. It may be modified in form and construction as desired, provided only that it is adapted to be operated or propelled positively by an electric current. The propulsion of the signal by the electric current forms in my peculiar system an important feature, and is not to be confused with an arrangement wherein the electric current releases or unlocks a signal propelled by means other than the electric current.

In erecting the apparatus the signal-instrument G is located at the crossing or other station and electric conductors L extended thence to the generator, which will be located, as before stated, beside the main track at any suitable distance in advance of the signal. Each railway-train in passing transmits motion through the intermediate parts to the generator. The generator in turn develops an electric current, which is transmitted through the conductors in advance of the train to the signal-instrument, which will be propelled or driven positively by said current. The generator, continuing in action after the passage of the train, serves to impart a continuing action to the signal, which will continue to ring after the train has passed the generator and until it has reached the signal. In this way warning is given by the signal for a considerable period of time before it is reached by the train.

While it is preferred to retain the construction shown in the drawings, it is manifest that the fly-wheel may be applied to prolong the action of a magneto-generator of any suitable form, the invention in this regard consisting in combining with any suitable magneto-generator having appliances whereby it is operated from railway-trains a fly-wheel arranged to continue the action after the train has passed.

It is also obvious that, as regards the combination of a magneto-generator and a signal-bell propelled or driven by the electric current, the invention is not based upon the peculiar construction of the generator, as a generator of any approved form adapted to continue in action after the passage of the train may be used in connection with any suitable operating devices which are the equivalent of those shown.

I do not claim herein the combination of a rotary generator and appliances for operating the same with an electric current which serves to release or unlock a signal operated by means other than the electric current.

I do not claim herein a signal system in which a vibratory generator receives a single impulse from each passing car-wheel, the generator thus arranged receiving but few widely-separated impulses, and ceasing to operate the instant that the train has passed. I believe myself to be the first to produce an automatic system wherein a single blow or action from the train will produce a long-continued current or succession of currents, and in which the signal-instrument is propelled or driven by the current after the train has passed the generator.

What I claim as my invention is—

1. In an automatic railway-signal, the combination of the following elements: a magneto-electric generator, appliances, substantially as shown, for imparting a continuing motion to said generator from passing railway-trains, a signal-instrument provided with an electro-magnet, whereby it is positively propelled or actuated, and an electric conductor extending from the generator to the signal, substantially as shown, whereby an electric current may be produced by the train and applied as the motive power to propel the signal with a continuing action.

2. In an automatic railway-signal, the combination of a magneto-electric generator, appliances, substantially as shown, whereby a passing car-wheel is caused to actuate the generator in a prolonged or continuing manner, an alarm-bell, a vibrating striker, and an electro-magnet arranged to operate the striker and connected electrically with the generator, substantially as described and shown.

3. In an automatic railway-signal, the combination of a magneto-generator, appliances, substantially as described, for setting said generator in action from passing railway-trains, and a fly-wheel or equivalent device for continuing or prolonging the motion of the generator after the passage of the train.

4. In an automatic railway-signal, the combination, with driving devices adapted to be actuated by passing trains, of a magneto-electric generator having its armature and a fly-wheel mounted on one and the same shaft.

5. In an automatic railway-signal, the combination of an electrically-propelled signal located at a crossing or other point to be guarded, a magneto-electric generator located beside the railway-track in advance of the signal and electrically connected with the signal, and appliances, substantially as described, whereby a passing car-wheel is caused to actuate the generator so as to produce a prolonged current or succession of currents.

6. The combination, in a railway-signal system, of a bell-alarm provided with an electro-magnet, whereby it is propelled, a magneto-generator connected electrically with said signal, a fly-wheel applied to the generator, and appliances, substantially as shown, whereby motion is imparted to the generator by the action of passing trains.

7. The combination of the rock-shaft, having the two arms, with the armature, its shaft, and the arm or bar upon said shaft.

8. The combination of the rotary shaft, having an armature thereon, a bar or arm attached to said shaft, and a rock-shaft provided with an arm to operate upon said bar, and with a second arm adapted to be operated by passing railway-trains.

9. The combination of the shaft, the armature thereon, the yielding dogs attached to the shaft, and a rock-shaft provided with the two arms, as described and shown.

10. In combination with the rock-shaft, having the horizontal and vertical arms, the vertical shaft provided with the armature, the fly-wheel, and the yielding dogs $e$.

11. In combination with the vertical shaft, having the armature mounted thereon, the rock-shaft provided with the two arms, and an intermediate connecting-dog arranged to yield in one direction only.

WESLEY WARD GARY.

Witnesses:
JOHN B. TAFT,
STILLMAN B. ALLEN.